United States Patent [19]

Kopas et al.

[11] 4,275,089
[45] Jun. 23, 1981

[54] PURIFICATION OF VEGETABLE OIL

[76] Inventors: George A. Kopas, 1607 - 35th Ave., San Francisco, Calif. 94122; Merton E. Boomer, 4901 Stacy St., Oakland, Calif. 94605

[21] Appl. No.: 796,447

[22] Filed: May 12, 1977

[51] Int. Cl.³ .............................................. A23D 5/02
[52] U.S. Cl. .................................. 426/601; 426/662; 426/807
[58] Field of Search ............................ 260/403, 428.5; 426/601, 807, 2, 609, 662

[56] References Cited

U.S. PATENT DOCUMENTS

| 2,020,662 | 11/1935 | Schwieger et al. | 260/403 |
|---|---|---|---|
| 2,269,772 | 1/1942 | Kruse | 260/403 |
| 2,494,771 | 1/1950 | Markley | 426/662 X |
| 2,686,190 | 8/1954 | Myers | 260/403 |
| 2,970,910 | 2/1961 | Thurman | 426/662 |

*Primary Examiner*—Robert A. Yoncoskie
*Attorney, Agent, or Firm*—Manfred M. Warren; Robert B. Chickering; Glen R. Grunewald

[57] ABSTRACT

The method of degumming vegetable oil to produce an improved, degummed oil and gum with improved storage and other properties, which method includes extracting the gum with a solvent, stripping the gum from the solvent by steam under a relatively low vacuum, i.e., between 0 and 28 inches of Hg (mercury) below atmospheric pressure, and then centrifuging the gum in a desludging-type centrifuge without further addition of water. The gum thus obtained may be mixed with at least 15% acidulated fat to produce a pumpable, stable liquid having high value as an animal feed supplement.

6 Claims, 1 Drawing Figure

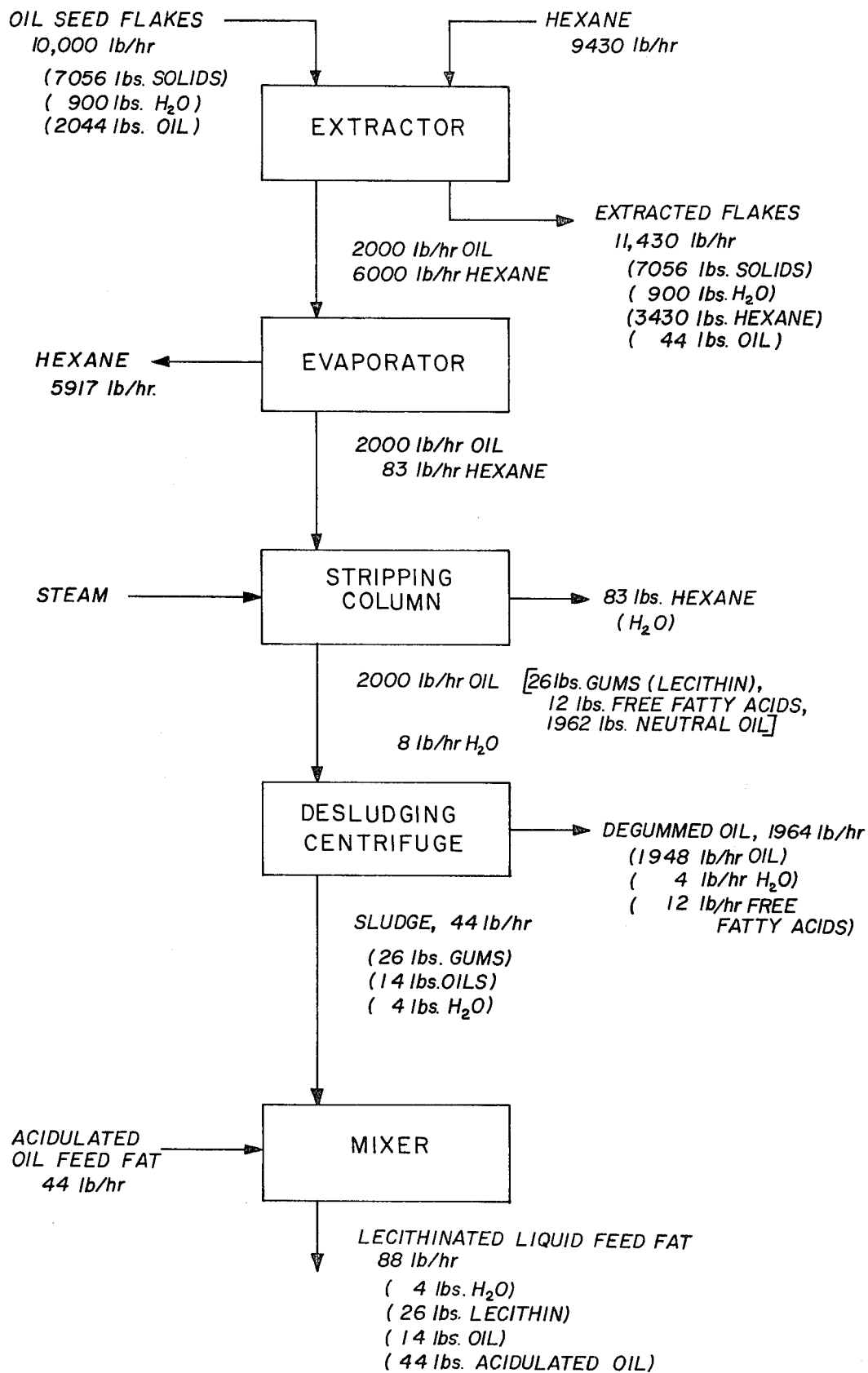

PURIFICATION OF VEGETABLE OIL

BACKGROUND OF THE INVENTION

This invention pertains to the purification of vegetable oil, and particularly to the degumming of such oil.

Oil extracted from vegetable matter such as soy beans, cottonseeds, peanuts and the like has many uses, particularly as food for animals and humans. While such oil may be extracted mechanically by pressing the seeds or beans, it is common to extract the oil with a solvent such as hexane. Frequently, oil is extracted from the bean residue after pressing. It is this solvent extraction method to which the present invention applies.

While most of the solvent can be removed from the oil in an evaporator by heating it to about 200°–250° F., it is necessary to remove the last traces of solvent by steam stripping. This is conventionally done by injecting steam into the bottom of a stripping column while maintaining a vacuum of from 24 to 29 inches of Hg at the top. The vacuum is expressed as inches of mercury less than atmospheric pressure, i.e., a negative gauge pressure.

The crude oil thus extracted still contains impurities which must be removed for must uses. Among these impurities are the so-called gums or phosphatides often referred to, particularly in the case of soy bean oil, as lecithin. The amount of these impurities differs in different oils, ranging from 0.1% or less up to 3% or more in oil such as soy bean oil. Lecithin removed from vegetable oil is a useful product. It may be used as such in animal feed and when dried and purified it may be used in human foods such as margarin, candy, artificial creamers, and many others.

There are a number of methods for removing the phosphatides or "gums" from crude vegetable oil. One of the methods is to add water to hydrate the phosphatides to precipitate them as a sludge. The hydration is conventionally done by mixing water with oil in a mixer where intimate contact is maintained until gum precipitates. The hydrated gums are heavier than the oil and can be separated from the oil on the basis of density of settling or in a device known as a degumming centrifuge. A certain amount of water is taken up by the oil in the steam stripping operation, usually about 0.1% to 0.5% based on the weight of oil. All percentages stated in this specification and the appended claims are on a weight basis. Because of the high vacuum and high temperature used in this step, insufficient water is taken up to fully hydrate the phosphatides. Generally, an amount of water about equal in weight to the content of the phosphatides or gums in the oil is needed. For example, about 1.5%–3% water would be needed to precipitate gums from soy bean oil. Accordingly, it is necessary to add water to the stripped oil and to hold the mixture in a mixer and maintain good contact between the oil and water phases for a sufficient time for hydration of the gums to take place. In addition, it is necessary to add water in excess of that needed to precipitate hydrated gum or sludge so that the "gum" or lecithin or sludge removed in the degumming-type centrifuge will have sufficiently low viscosity to discharge from that apparatus as a separate phase. As will be discussed below, the lecithin or gum removed from this type centrifuge typically contains about 30% to 45% water.

By the term "degumming-type centrifuge" is meant a centrifuge of the type commonly used in this industry: for example, a Model OSM 8004 centrifuge manufactured by Westphalia wherein two material of different specific gravities are separated and the apparatus is designed to discharge the higher density material at a relatively low viscosity, i.e., a viscosity less than 5000 poises.

The products of this centrifuging step are degummed oil and wet gum. The latter contains roughly equal parts of oil, lecithin, and water. This material must be immediately dried, used, or processed, or it will ferment within a day or so. Fermented or spoiled gum is a viscous, useless material which is expensive to dispose of.

In an alternative type of processing, the crude oil can be taken without prior degumming directly to a caustic refining step where caustic (e.g., sodium hydroxide or sodium carbonate) is added to remove the free fatty acids from the oil as soaps. The caustic phase, which is known as soapstock and includes the hydrated phosphatides or gum, is separated from the oil in a refining centrifuge as the heavy phase. The soapstock is neutralized with acid (e.g., sulfuric) and washed with water to produce waste water, which must be treated before it can be disposed of, and a dark, high free fatty acid product known as "acidulated oil." This latter product finds use as a cattle feed, as do the extracted seed flakes produced in the original extraction of oil with solvent. When vegetable oils are processed in this manner, lecithin cannot be recovered because it is destroyed by the caustic and acid treatment.

In still another alternative processing method, the hydrated oil can be centrifuged to remove the gums, and the degummed oil is then sent to a caustic refining step. This method has the advantage that less caustic and acid are used and there is greater recovery of usable products.

The present invention is an improvement over the conventional methods of degumming and refining vegetable oil by hydration and centrifuging which simplifies the process by eliminating certain steps and which additionally produces an improved lecithin product.

The art of purifying vegetable oils is well set forht in an article by Roy A. Carr in the *Journal of American Oil Chemists Society,* Volume 53, June 1976, starting at page 347. The terms "hydrated gums", "sludge", and "lecithin" are used interchangeably when used to refer to a precipitated phase or a separate phase within the oil that can be separated by gravity.

SUMMARY OF THE INVENTION

According to this invention, a solvent extracted vegetable oil is degummed by stripping the solvent from the oil with steam at a pressure of from 0 to 26 inches of Hg below atmospheric and at a temperature to produce a hydrated gum phase containing from 5% to 15% water, and the stripped oil, without further addition of water or further mixing, is centrifuged in a desludging-type centrifuge to recover the hydrated gums, or sludge, which may be stored for long periods without spoiling. In addition, the resulting lecithin sludge can be mixed with at least 15% acidulated oil to a produce a novel composition which is a pumpable liquid having excellent properties as a feedstock supplement for livestock.

BRIEF DESCRIPTION OF THE DRAWING

The accompanying drawing is a schematic flow chart of the process of this invention showing the amounts of materials in the example given below.

DETAILED DESCRIPTION

While the process of the present invention can be used with any vegetable oil, it is most useful with oils extracted from seed such as soy bean, safflower, corn, wheat, cotton, rice, peanut, rape, sunflower, and flax (linseed oil) which contains significant amounts (e.g., at least 0.5% of the weight of the oil) of phosphatides or lecithin. It is particular useful in degumming soy bean oil, sunflower oil, and safflower oil.

In the process of this invention, seeds are prepared and oil is extracted with a suitable solvent such as hexane by known methods. The solvent is then evaporated from the oil. After evaporation of most of the solvent, the oil is steam-stripped in a stripping column of conventional design, but instead of operating it at the normal, fairly high vacuum of 24 to 28 inches of Hg, and high temperature, it is operated at conditions to hydrate sludge to a level of 5% to 15% $H_2O$, usually at a pressure from 0 to 28 inches of Hg below atmospheric pressure and a suitable temperature. This lesser vacuum along with appropriate temperature control results in more steam being taken up by the oil and causes hydration of the phosphatides. The stripping operation also provides the intimate contact between oil and water as well as the time necessary for the hydration of gums to be effected. The amount of steam used should be enough to insure both that stripping of the solvent is completed and that hydration of the gums is adequately accomplished. Normally the use of enough steam to completely strip the solvent from the oil will cause hydration of substantially all of the gums in the pressure range of from 0 to 28 inches of mercury below atmospheric and employing saturated or slightly superheated steam.

The exact pressure and temperature at which the stripper is operated is chosen so that the oil takes up the amount of water needed to hydrate the phosphatides, i.e., so that the water content of the resulting gums is between 5% and 15%, preferably from 5% to 10%, for example, about 8% by weight. It is not necessary to add extra water to give the resulting sludge a lower viscosity to enable it to pass through the centrifuge since the desludging-type centrifuge used in the subsequent step is able to discharge extremely high viscosity sludges. The desludging-type centrifuge can discharge any solids that may be in the oil. Thus, this process eliminates the need for the addition of "degumming water" and the step of holding the mixture in a vessel and stirring or otherwise maintaining intimate contact between the phases to cause the hydration reaction to take place. It also eliminates the need for miscella filtering systems or, alternatively, the need for down time to clean degumming-type centrifuges of accumulated solids.

By the term "desludging-type centrifuge" is meant a centrifuge such as Model SAOH5036 manufactured by Westphalia or Model SRPX 317 manufactured by DeLaval wherein two liquids of differing specific gravities are separated and the apparatus is designed to discharge a sludge of very high viscosity (e.g., over 5000 poises).

The lecithin sludge resulting from the process of this invention contains less than 15%, typically about 5% to 10% water and about equal weight parts of oil and lecithin. It has an extremely high viscosity (i.e., over 3,000 poises) and it cannot be pumped with conventional pumps even when it is heated.

The lecithin sludge may be used as is, for example, in cattle feed, or it may be further refined to produce human food grade lecithin. In this case, the product of this invention requires much less water removal than lecithin recovered from prior processes with a consequent saving in energy costs. Additionally, the removal of less water can be accomplished more quickly and the lecithin is exposed to heat for a shorter period which minimizes deterioration during drying.

A particular advantage of the lecithin produced by the process of this invention is that it can, if necessary or desirable, be stored for months without fermenting. This is in contrast to the lecithin produced by conventional processes which must be dried or otherwise processed (e.g., acidulated) or it will ferment. The term "ferment" is used in this art to describe deterioration of the lecithin wherein it becomes spoiled and not useful for human or animal food or for any other purpose. The term is not used in the sense of converting sugar to alcohol.

A particular advantage of this invention is that when the sludge is mixed with acidulated oil there results a pumpable fluid which is useful as a high-energy animal feed ingredient without modifying methods of handling, metering or mixing that are currently in use for preparing animal feeds.

Hydrated gums are a tarry mass that do not liquify even when heated. It has been found that when acidulated oil is blended with hydrated gums there results a flowable liquid which can easily be pumped and handled with conventional equipment. As little as 15% acidulated oil added to the gums results in a pumpable mixture having a low viscosity.

EXAMPLE

The following example pertains to a continuous process operated according to this invention, and the amounts of materials given in the description and the drawing are amounts processed per hour.

Safflower seeds were mechanically pressed, and 10,000 lb of the residue seed flakes containing 7056 lb solids, 900 lb $H_2O$, and 2044 lb oil were fed to an extractor together with 9430 lb hexane. Extracted flakes at the rate of 11,430 lb and containing 7056 lb solids, 900 lb $H_2O$, 3430 lb hexane, and 44 lb oil were removed from the extractor. This latter mixture (called miscella) was fed to an evaporator operated between 180° F. and 250° F. at atmospheric pressure which removed 5917 lb hexane, discharging in a separate stream a mixture of 2000 lb oil and 83 lb hexane. This latter stream was fed to a disc and donut stream stripping column operated at 18 inches of Hg below atmospheric and at 210° F. Water vapor and 83 lb of hexane were taken from the top of the stripper, and 2000 lb of oil and 8 lb of $H_2O$ were recovered as a liquid phase.

The material that has so far in this example been referred to as "oil" is better referred to as "crude oil" since it actually contained 26 lb gum, 12 lb free fatty acid in addition to 1962 lb neutral oil, i.e., oil free of gums and fatty acids. This "crude oil" was fed to an SAOH 5036 Westphalia centrfuge which discharged 1964 lb of a degummed oil containing 4 lb $H_2O$, 12 lb free fatty acids, and 1948 lb neutral oil. The centrifuge also discharged 44 lb sludge containing 26 lb of gum, 14 lb of oil and 4 lb of $H_2O$ as a separate phase.

The two preceding products, the degummed oil and the lecithin sludge, may be compared to those produced by a conventional process wherein the steam stripping is carried out at about 29 inches of Hg below atmospheric pressure and at the same temperature. On the same basis of 2000 lb of unpurified or crude oil containing the same amounts of gums and free fatty acids, the conventional stripping and separate hydration process used in the prior art requires 35 lb of $H_2O$ and upon separation produces an oil phase containing 8 lb of water and a gum phase containing 27 lb of water. In contrast, the process of this invention uses only 8 lb of water in the hydration process and it is distributed between the phases, after they are separated, to produce an oil phase containing 4 lb of water and a gum phase containing only 4 lb of water. Gum containing 27 lb of $H_2O$ as produced by the prior art quickly ferments, while gum containing 4 lb of water is a stable product.

An advantage of the oil produced according to this invention is that because of its low water content it does not need vacuum drying but can be used to produce directly by filtration with bleaching clays or other reagents an oil suitable for deodorizing to make an edible oil or an oil for industrial purposes. A caustic refining step is not required. The degummed oil produced by this process is also suitable for admixing with oil expressed from oil seed by mechanical means, and the two filtered together to make industrial oils or edible oils after deodorization.

Among the advantages of the gum produced by the method of this invention are that, due to its low water content, it does not need to be dried to prevent fermentation. If it is desired to dry it to produce human food-grade lecithin, the cost is much less, again due to the small amount of water to be removed. In addition, the lesser exposure to high temperature in removing a small amount of water will minimize thermal deterioration during drying.

The 44 lb of sludge produced in the foregoing example were admixed with 44 lb of acidulated oil feed fat obtained from a caustic refining process to produce 88 lb of lecithinated liquid feed fat. Although the sludge has a viscosity of over 6000 poises and is unpumpable, the admixture is a readily pumpable liquid with a viscosity less than 3000 poises, and it could be metered into animal feed using the equipment that is already in use and available for that purpose. In addition to being used in the same way that animal "feed fat" is now being used, the acidulated oil-sludge mixture of this invention has a better feed value at a comparable cost to feed fat.

Adoption of the present process has advantages for many different types of operators. A basic processor who only extracts oil but does not degum it or refine it can add degumming equipment for this process at a relatively low cost since he does not need a proportioning system to add water to the stripped oil nor a drier for the degummed oil. By adopting this process, the basic processor is able to produce a degummed oil which is of greater value than crude oil, to overcome the problem of sludge setting out in his storage tanks, and to recover sludge as a salable product rather than as a waste that is difficult to dispose of.

For the degummer who does not have means to filter miscella and dry the gums produced, adoption of this process means that he can produce a product of higher value, one that does not have to be disposed of quickly and perhaps at a disadvantageous price before it spoils; he can operate a more economical process from the standpoint of energy consumption and the process does not create large quantities of waste water to be treated and disposed of.

Finally, even a producer who is equipped to dry the gum he produces, or one who refines his oil rather than degumming it, will benefit by adoption of the present process because of the lower capital and operating costs.

The process of this invention can usually be carried out with conditions in the stripper that cause the gums to be hydrated to contain from 5% to 15% $H_2O$. However, it is within the scope of this invention to maintain a separate mixer downstream of the stripper in which oil and water are maintained in contact to complete hydration of gums to the 5% to 15% $H_2O$ level. A separate contact vessel will be used in those situations where the particular oil will contain gums that cannot be adequately hydrated in the stripper. In any case, the degree of contact between oil and water and the time of such contact will be much less than the contact required in processes of the prior art.

What is claimed is:

1. A process for producing a pumpable animal feed material including the steps of extracting vegetable oil from vegetable matter with a solvent for the oil, stripping solvent from the oil with steam at a pressure from 0 to 28 inches of Hg below atomspheric pressure and at a temperature such that without further addition of $H_2O$ after steam stripping of the solvent, sludge hydrated to a $H_2O$ content between 5 percent and 15 percent is formed, separating said sludge from said oil and combining said sludge with at least 15 percent acidulated oil feed fat.

2. A composition consisting essentially of at least 15 percent acidulated oil feed fat and lecithin containing from about 5 percent to about 15 percent $H_2O$.

3. The composition of claim 2 obtained from soy bean oil.

4. The composition of claim 2 obtained from safflower seed oil.

5. The composition of claim 2 obtained from sunflower seed oil.

6. The composition of claim 2 containing about equal weights of lecithin and acidulated oil feed fat.

* * * * *